UNITED STATES PATENT OFFICE.

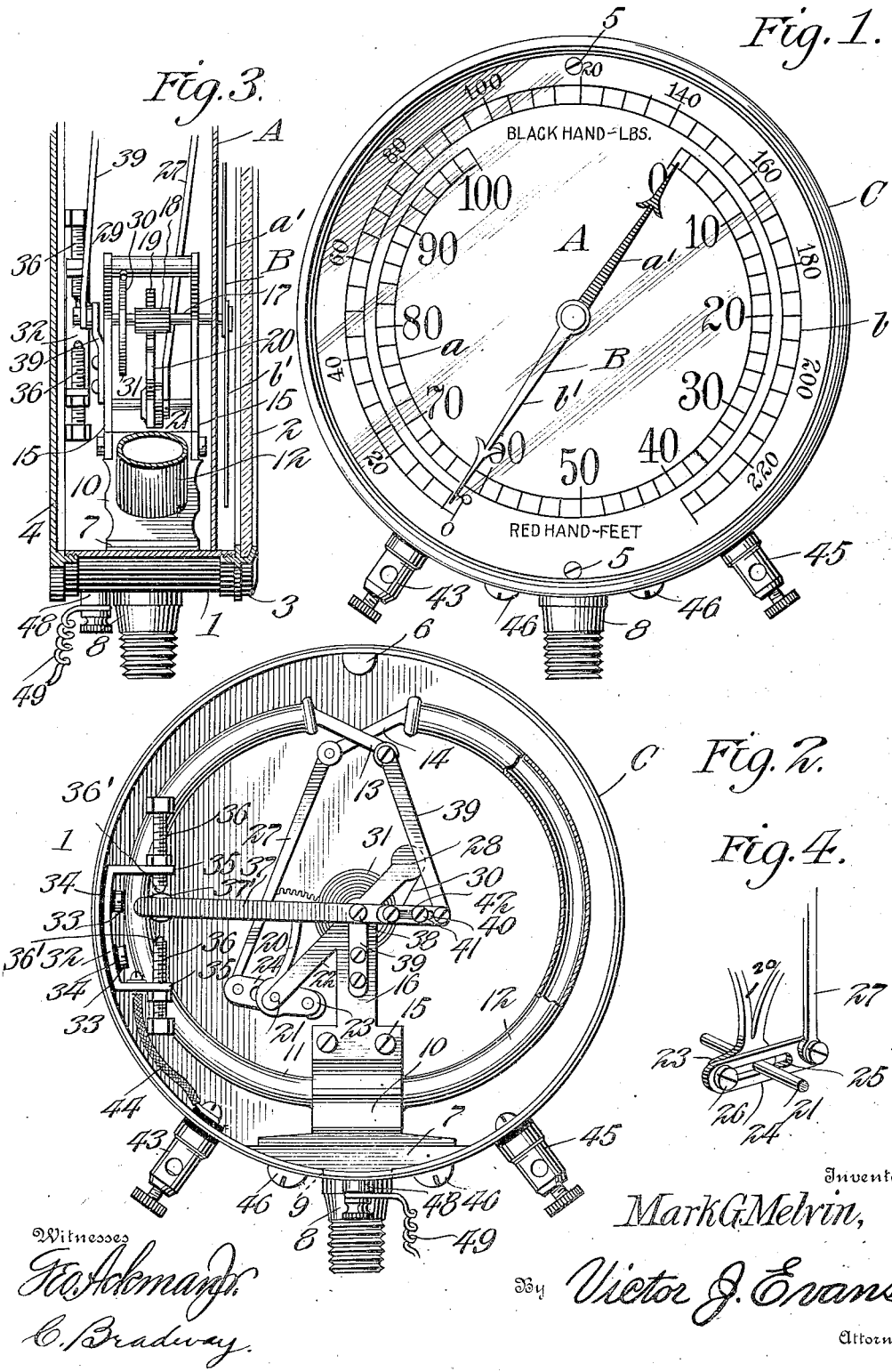

MARK G. MELVIN, OF SCRANTON, PENNSYLVANIA.

COMBINED GAGE AND SIGNAL DEVICE.

No. 908,300.　　　　Specification of Letters Patent.　　　Patented Dec. 29, 1908.

Application filed December 3, 1907. Serial No. 404,950.

*To all whom it may concern:*

Be it known that I, MARK G. MELVIN, a citizen of the United States, residing at Scranton, in the county of Lackawanna and State of Pennsylvania, have invented new and useful Improvements in a Combined Gage and Signal Device, of which the following is a specification.

This invention relates to a gage of that type having separate "Bourdon" tubes connected with a single source of pressure, one tube being associated with an indicating mechanism for indicating the pressure of a fluid in pounds or the level of a liquid in feet, and the other tube being associated with an electric switch for closing a circuit, including a signal when the pressure or level reaches an abnormally high or low limit.

The invention has for one of its objects to improve and simplify the construction and operation of apparatus of this character so as to be effective in service, simple and durable, and manufactured at comparatively little expense.

A further object of the invention is the provision of a combined gage and signaling device in which the operating parts are mounted in such a manner as to be removable with the "Bourdon" tubes and their support, while the parts are intact, thus facilitating the assembling of the various parts in the manufacture of the instrument or the repair of the instrument at any time.

Another object is to so design the instrument that the circuit-closing device will be entirely housed within the same casing containing the expansible tubes and mechanisms connected therewith, the circuit-closing device including adjustable contacts arranged inside the casing and supported on the wall thereof, and coöperating with the contacts is a movable contact element or blade for completing the circuit under abnormal conditions.

With these objects in view and others, as will appear as the description proceeds, the invention comprises the various novel features of construction and arrangement of parts which will be more fully described hereinafter and set forth with particularity in the claims appended hereto.

In the accompanying drawing, which illustrates one of the embodiments of the invention, Figure 1 is a front view of the combined gage and signal device. Fig. 2 is a rear view with the back of the casing removed and showing one of the "Bourdon" tubes partially in section. Fig. 3 is a sectional view of the device. Fig. 4 is a fragmentary perspective view of parts of the mechanism.

Similar reference characters are employed to designate corresponding parts throughout the several views.

The gage, in the presence instance, is designed for use as a pressure indicator whereby the pressure of a steam boiler or the like can be ascertained at any time or as a level indicator for determining the height of water or other liquid in a tank, and in connection therewith is employed a signal device which may include an electric alarm located in an engineer's office or other remote point to give a warning when the pressure of the steam or the level of the water reaches a predetermined high or low limit.

Referring to the drawing, A designates a dial including separate scales $a$ and $b$ which are divided respectively, into units for indicating pressure in pounds and height in feet. A double-ended needle or hand B is used in connection with both scales, the arm $a'$ of the needle being black or other appropriate color corresponding to the color of the scale $a$ from which the indications are taken by the said arm. The arm $b'$ is longer than the other arm so as to extend over the outer scale $b$, which is red or other suitable color, to correspond with the said arm. The arms extend in opposite directions and the zero marks of the scales are disposed at diametrically opposite points.

The dial A is mounted in a casing C composed of a cylindrical shell 1, a glass front 2 secured in a ring 3 screwed on the shell, and a back plate 4 also removably secured in place by screwing on the shell. The dial A is fixed in the casing by screws 5 that pass through apertures in the dial and screw into bosses 6 arranged on the shell of the casing, one of the bosses being shown at the top of Fig. 2.

Within the casing is a base piece or support 7 that has a threaded nipple 8 that extends through an opening 9 in the casing so as to be attached to a pipe and rising from the base piece is a hollow head 10 to which the lower ends of the symmetrically disposed "Bourdon" tubes 11 and 12 are connected so that the same pressure will act upon both tubes with equal effect. The upper closed ends of the tubes are provided with downwardly inclined arms 13 and 14 which cross each other, the first arm being connected with the movable element of the circuit closer and the second arm being connected with the needle actuating mechanism. Secured by screws 15 to the head 10 and rising from opposite sides thereof are spaced standards 16 in which the arbor 17 is mounted, the said arbor extending through the dial for connection with the needle B. On the arbor 17 is a pinion 18 with which meshes a toothed sector 19 carried by an oscillatory frame 20. The frame 20 swings on a rod 21 supported in the lower extremities of the inclined arms 22 on the standards 16. The frame 20 has an extension 23 to which is adjustably secured the slotted member 24, the rod 21 passing through the slot 25 as shown in Fig. 4 so as to permit the member to be adjusted longitudinally. The member is held in fixed position by a screw 26 passing through the slot and screwing into the extension 23. The tube 12 is connected by a link 27 with the member 24 and the said member forms an adjustable connection between the tube and sector-carrying frame 20, whereby the adjustment of the needle with respect to the scales can be accurately obtained. Projecting upwardly and outwardly from the extensions 22 are extensions 28 that support a cross piece 29 and connected with the latter is the outer end 30 of a hair spring 31, the inner end of which is secured to the arbor 17 so as to return the needle to initial position.

The circuit closer for the signal-including circuit comprises a U-shaped frame 32 which is secured to the shell 1 by the screws or other fastenings 33, the frame being insulated from the shell and screws by rubber, fiber or the like indicated at 34. The parallel arms 35 of the frame are apertured to receive the upper and lower adjustable contacts 36 which are preferably screws so that they can be adjusted toward or away from each other to vary the range of operation. Movable between the contacts 36 is a blade or contact element 37 that is fulcrumed at 38 in line with the arbor 17, on a bracket 39. Between the arm 13 and element 37 is a link 39 that has its upper ends hingedly connected with the said arm and its lower end adjustably secured to the element by a slotted member 40, which member is secured in position by screws 41 passing through the slot 42 of the member and screwing into the element. By this arrangement, the expansion of the tube 11 will cause the element 37 to move toward and contact with the lower contact 36 and thereby close the alarm - including circuit when the pressure or level of the fluid becomes abnormally high. The contraction of the tube causes a reverse movement so that the circuit will be closed by the element 37 engaging the upper contact as shown in Fig. 2 under abnormally low conditions as to pressure or level. The frame 32 is electrically connected with the binding post 43 by a conductor 44, and the casing is electrically connected with the binding post 45, so that the circuit is completed through the binding post 45, casing C, base piece 7, standard 16, bracket 39, element 37, one of the contacts 36, frame 32, conductor 44, and other binding post 43.

By providing separate "Bourdon" tubes for the purpose of actuating the indicating needle and the circuit closer, the needle can continue to move after the circuit-closing switch is entirely closed by the other tube, so that the exact condition as to pressure or height of liquid in the system with which the apparatus is used can be ascertained from the needle, should the alarm device fail to operate for any reason. As the working parts are all carried by the base piece 7, they can be readily removed from the casing without disassembling the parts, it being necessary to remove screws 46 and either the front or the base of the casing to permit the internal mechanism to be lifted out. It will thus be seen that inspection or repair of the mechanism can be easily and quickly accomplished.

The contacts 36 are preferably tipped with platinum, as indicated at 36' and the element 37 has pieces 37' of platinum arranged in coöperative relation with the platinum tipped contacts 36, so that the sparking when the alarm circuit is broken will not destroy the parts.

In order to prevent damage to the instrument from accidental passage therethrough of current in case of grounding of the instrument when the latter is used in an electric power house, a binding post 48 is provided on the casing of the instrument and a grounded wire 49 may be connected therewith so as to admit of a high voltage current to be carried off without causing damage.

From the foregoing description, taken in connection with the accompanying drawing, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative and that such changes may be made when desired as are within the scope of the claims.

Having thus described the invention, what I claim is:—

1. In an apparatus of the class described, the combination of a casing, binding posts mounted on the casing, a pressure responsive tube a base supporting the tube and provided with means exterior to the casing for connection with a pipe, a fulcrumed contact member, a link connecting the free end of the tube with the member, an insulated support arranged within the casing and supported on the latter and provided with apertured extremities, adjustable contacts mounted in the apertures of the extremities and disposed at opposite sides of the free end of the contact member for engagement therewith, in combination with an indicating mechanism.

2. In an apparatus of the class described, the combination of a casing, a pressure-actuated tube, means for mounting the tube in the casing, a fulcrumed contact element in the casing, a link hingedly connected with the free end of the tube, a member adjustably secured to one end of the element, a hinged connection between the member and link, a supporting member within the casing and insulated therefrom, and alining screws on the supporting member and arranged with their inner ends spaced apart at opposite sides of the free end of the said element.

3. The combination of a pressure gage casing, an element movable in response to variations in pressure and mounted within the casing, a support arranged within the casing and insulated therefrom, means for securing the support in fixed position, adjustable contacts mounted on the support and electrically connected therewith and disposed at opposite sides of the said element for contact therewith during abnormally high or low pressure, binding posts for connection with a signal circuit, means for electrically connecting one binding post with the said element, a connection within the casing for electrically connecting the other post with the said support, and means for insulating one post from the other.

4. In an apparatus of the class described, the combination of a casing, a base piece removably secured therein, a flexible tube connected with the base piece, standards mounted on the base piece, indicating mechanism mounted on and removable with the standards, a bracket on one of the standards, a pivoted contact element on the bracket, a link attached to the free end of the tube, an adjustable connection between the link and element, a support mounted wholly within and insulated from the casing, adjustable contacts on the support and arranged to be engaged by the element, a binding post electrically connected with the support and insulated from the casing, and a binding post electrically connected with the casing.

In testimony whereof I affix my signature in presence of two witnesses.

MARK G. MELVIN.

Witnesses:
JOSEPH F. GILROY,
PATRICK C. GILMARTIN.